US006717138B2

(12) United States Patent
Kernan et al.

(10) Patent No.: US 6,717,138 B2
(45) Date of Patent: *Apr. 6, 2004

(54) MASK PLATE WITH LOBED APERTURE

(75) Inventors: Jeffrey T. Kernan, Santa Cruz, CA (US); Patrick D. Perkins, Sunnyvale, CA (US)

(73) Assignee: Agilent, Technologies, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 10/293,118

(22) Filed: Nov. 13, 2002

(65) Prior Publication Data

US 2003/0075681 A1 Apr. 24, 2003

Related U.S. Application Data

(63) Continuation of application No. 09/655,758, filed on Sep. 6, 2000, now Pat. No. 6,545,271.

(51) Int. Cl.[7] .......................... H01J 49/42; B01D 59/44

(52) U.S. Cl. ........................ 250/292; 250/281; 250/283

(58) Field of Search ................................ 250/292, 281, 250/283

(56) References Cited

U.S. PATENT DOCUMENTS

| | | | |
|---|---|---|---|
| 3,920,986 A | 11/1975 | Fies, Jr. | |
| 4,090,075 A | 5/1978 | Brinkmann | |
| 4,189,640 A | 2/1980 | Dawson | |
| 5,223,711 A | 6/1993 | Sanderson et al. | |
| 5,376,787 A | 12/1994 | Smith | |
| 6,025,590 A | 2/2000 | Itoi | |
| 6,545,271 B1 * | 4/2003 | Kernan et al. | 250/292 |

* cited by examiner

*Primary Examiner*—Nikita Wells
(74) *Attorney, Agent, or Firm*—Timothy H. Joyce

(57) ABSTRACT

An apparatus and method for removing neutral noise from a quadrupole mass filter ion beam. A mask plate has a lobed aperture centered on a longitudinal axis and positioned between a quadrupole mass filter exit end and an ion detector. The mask plate operates to remove neutral atoms from the ion beam that may interfere with instrument sensitivities. The lobed aperture passes the ion beam with little loss of the ion beam intensity. The invention substantially maintains signal intensity and removes unwanted noise from a mass spectrometer.

5 Claims, 7 Drawing Sheets

MASK PLATE WITH LOBED APERTURE

This is a continuation of application Ser. No. 09/655,758, filed on Sep. 6, 2000, now U.S. Pat. No. 6,545,271, the entire disclosure of which is incorporated herein by reference.

FIELD OF THE INVENTION

The invention relates to the field of mass spectrometry, and more particularly to techniques for improved ion separation and filtering. In particular, the invention relates to a mask plate with lobed aperture designed to reduce neutral noise while maintaining the overall intensity of the ion beam.

BACKGROUND OF THE INVENTION

Mass spectrometers are used today for analyzing various biochemical, organic and biomedical mixtures and compounds. Present limitations to performance (sensitivity and resolution) of quadrupole mass spectrometers are determined by the high mechanical precision needed in the manufacture and alignment of quadrupole mass filters and the limitation of resolution caused by the finite number of R.F. cycles the ions experience when passing through these devices during mass separation. The results often depend on the ion energy and also the deleterious effect of D.C. fringing fields at the entrance of these filters. Particular attention has, therefore, been spent on perfecting instrument components in hopes of improving overall instrument signal and removal of unwanted noise.

Initial studies on improving quadrupole mass filter devices were reported by U. Brinkmann in the International Journal of Mass Spectrometry and Ion Physics. 9 (1972), 161 and were followed by further investigations by A. E. Holmes et al. in the publication International Journal of Mass Spectrometry and Ion Physics, 26 (1978) 191–204. These initial studies sought to simplify the quadrupole electronic circuitry to improve overall signal to noise ratios in the instruments. Since then, due to improvements in electronics and signal detection and analysis, there no longer exist these electrical noise limitations.

Further studies began focusing on simpler and less-expensive mechanical ways for increasing signal and reducing noise in mass spectrometers. For instance, U.S. Pat. No. 4,189,640 of Dawson discloses a quadrupole mass spectrometer having a stop plate employed at the output end of the quadrupole rods to block the passage of axially-directed high-mass particles. However, many of these instruments, instrument parts or improvements have been ineffective in maintaining the overall ion signal. For instance, removing unwanted noise has often involved removing part of the ion beam, blocking part of the beam or interfering with the beam in some other way. These measures impair instrument sensitivity since they result in fewer ions reaching the ion detector. Furthermore, most of the existing mechanical or instrument improvements are unselective in that they simply separate extraneous ions or limit the overall diameter of the ion beam that reaches the detector. For these reasons there is a significant need for a simple device that will remove noise yet substantially maintain the overall signal level of the transmitted ion beam.

More recent work has focused on the classification and determination of the factors that contribute noise to the ion beam, for instance, chemical background noise, electronic noise, and neutral noise. However, removing neutral noise has been quite problematic. Neutral noise is noise apparently caused by excited neutral particles traveling in and near the ion beam path. Neutral noise is believed to be a result of helium metastables, other excited, long-lived species, or energetic photons entering the detector. Improvements have been made by decreasing the size of the quadrupole exit aperture that the ion beam passes through before reaching the detector. However, a side effect of reducing the exit aperture size is eventually an undesirable reduction in the ion signal. In pursuit of improved sensitivity, a goal is to eliminate neutral noise, while at the same time maintaining the level of the ion signal of the compound of interest.

It is, therefore, an object of the invention to provide an improved apparatus and method for reducing neutral noise in a mass spectrometer.

Another object of the invention is to provide an apparatus and method for improving the signal to noise ratio of an ion beam exiting from a quadrupole into a detector.

A still further object of the present invention is to reduce neutral noise in a quadrupolar system while maintaining the intensity of the transmitted ion beam. For example, neutral noise may be reduced, by blocking the particles that cause neutral noise from reaching a detector while at the same time maximizing the signal resulting from the ion beam.

SUMMARY OF THE INVENTION

In general, the invention provides a quadrupole mass spectrometer that comprises a mask plate defining a lobed aperture. The mask plate is disposed between a quadrupole mass filter and an ion detector. The lobed aperture has at least one lobe. When first and second lobes are provided, they are symmetric and extend radially from a longitudinal axis. In addition, the lobed aperture may additionally comprise third and fourth symmetric lobes extending radially from a longitudinal axis and orthogonal to the first and second lobes. The mask plate removes neutral atoms that impair the sensitivity of a mass spectrometer with a minimal reduction of the ion beam intensity.

DETAILED DESCRIPTION OF A PREFERRED EMBODIMENT OF THE INVENTION

Figure 1:
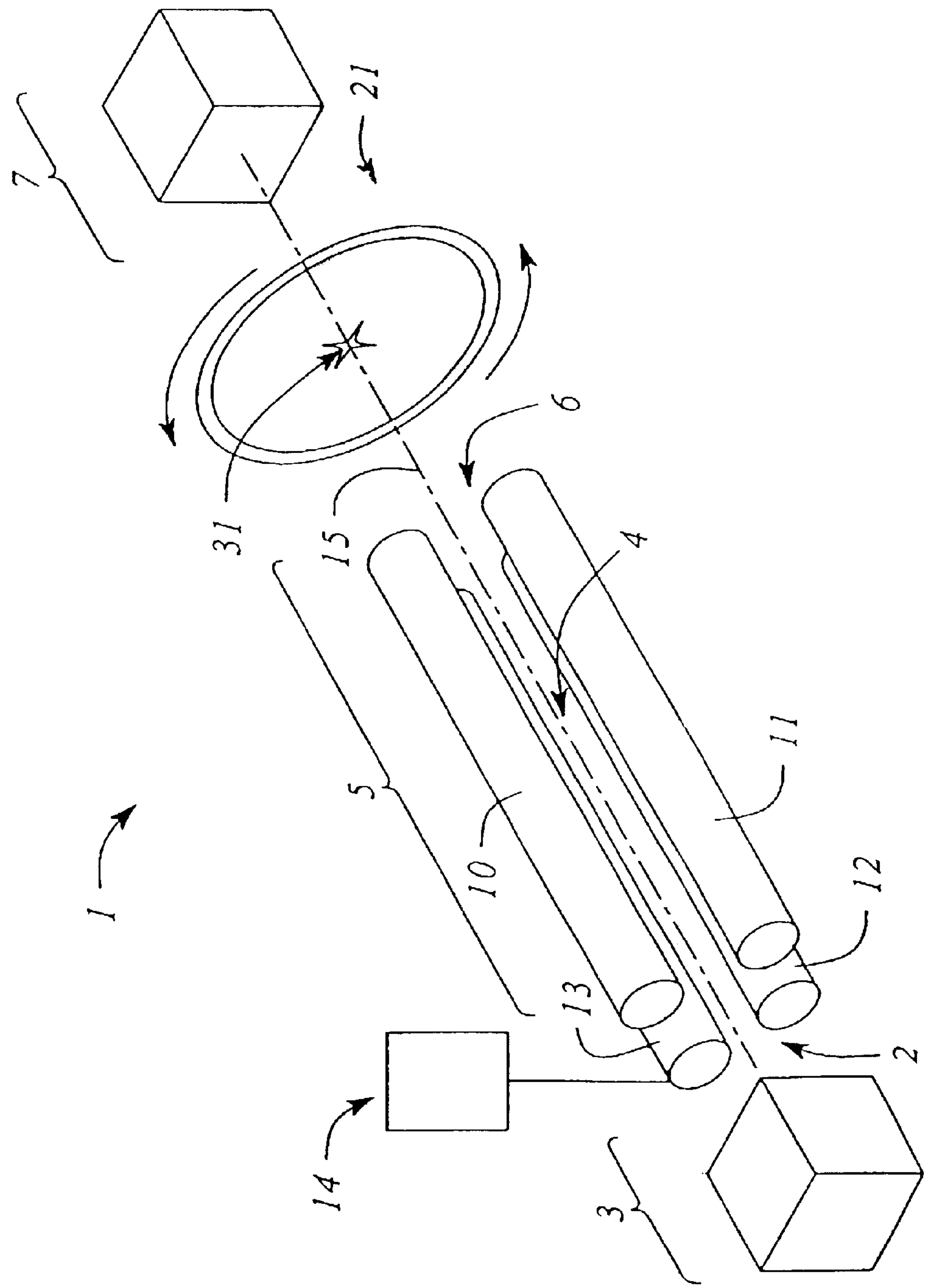
FIG. 1 is a perspective view of a mass spectrometer incorporating the invention.

FIG. 1 shows a perspective view of a quadrupole mass spectrometer 1 according to the invention. The mass spectrometer 1 includes an ion source 3, a quadrupole mass filter 5, an ion detector 7 and a mask plate 21 arranged along a longitudinal axis 15. The mask plate 21 is disposed between a mass filter 5 and the ion detector 7. The quadrupole mass filter 5 includes four cylindrical rods, 10, 11, 12 and 13, mounted parallel to each other and to the longitudinal axis 15 and disposed symmetrically about the longitudinal axis 15. The quadrupole mass filter generates a quadrupole field when rods 11 and 13 and 10 and 12 are interconnected and the interconnected pairs are electrically connected to a voltage source 14. The ions to be analyzed are projected along the longitudinal axis 15 from the ion source 3 through the quadrupole mass filter 5 to the ion detector 7. The ions to be analyzed are projected into the quadrupole mass filter 5 from the ion source 3 along the longitudinal axis 15, and the selected ions pass the through the mass filter 5, exiting in a region 6 surrounding the longitudinal axis 15 and subsequently passing into the ion detector 7.

It has been found that ions do not exit the mass filter 5 in a uniform distribution about the longitudinal axis 15. Instead, they exit preferentially along axes perpendicular to the longitudinal axis 15 and passing through the noses of opposite rod pairs 10, 12 and 11, 13. In so doing, the selected ions form a cross-shaped distribution pattern in a plane (the exit plane) orthogonal to the longitudinal axis 15 at the exit of the mass filter 15, with highest ion density in the immediate vicinity of the longitudinal axis 15. On the other hand, neutral particles that create noise in the detector are not affected by the fields in the mass filter 15 or other ion optical elements (not shown), so that they are distributed uniformly in intersection with the exit plane. There are, therefore, regions of the exit plane within the inscribed circle of radius $r_0$ through the rod noses through which pass many noise particles but very few ions (See FIG. 6A).

The novel concept of the invention is to take advantage of the differences in spatial distribution of the ions and of the neutral noise particles by providing the mask plate 21 with an aperture 31 shaped so as to pass substantially all the ions; the mask plate stopping all neutral noise particles outside the periphery of the aperture.

It has been found that the aperture should extend along the nose axes for a distance in the range of about $0.1r_0$ to about $0.9r_0$ from the longitudinal axis 15, typically about $0.7r_0$. The extent of the aperture could be less along the axis connecting the noses of the positive rods (for positive ions), but the aperture should extend for the same distance along each axis if both positive and negative ions are to be used. A larger distance of extent, up to about $1.5r_0$ can be useful if the mask plate is spaced more than about $r_0$ from the ends of rods 10, 11, 12, 13. Exemplary values of $r_0$ are about 1 mm to about 10 mm, typically about 4.5 mm. Values of $r_0$ larger than 10 mm are not uncommon in the art.

Figure 2:
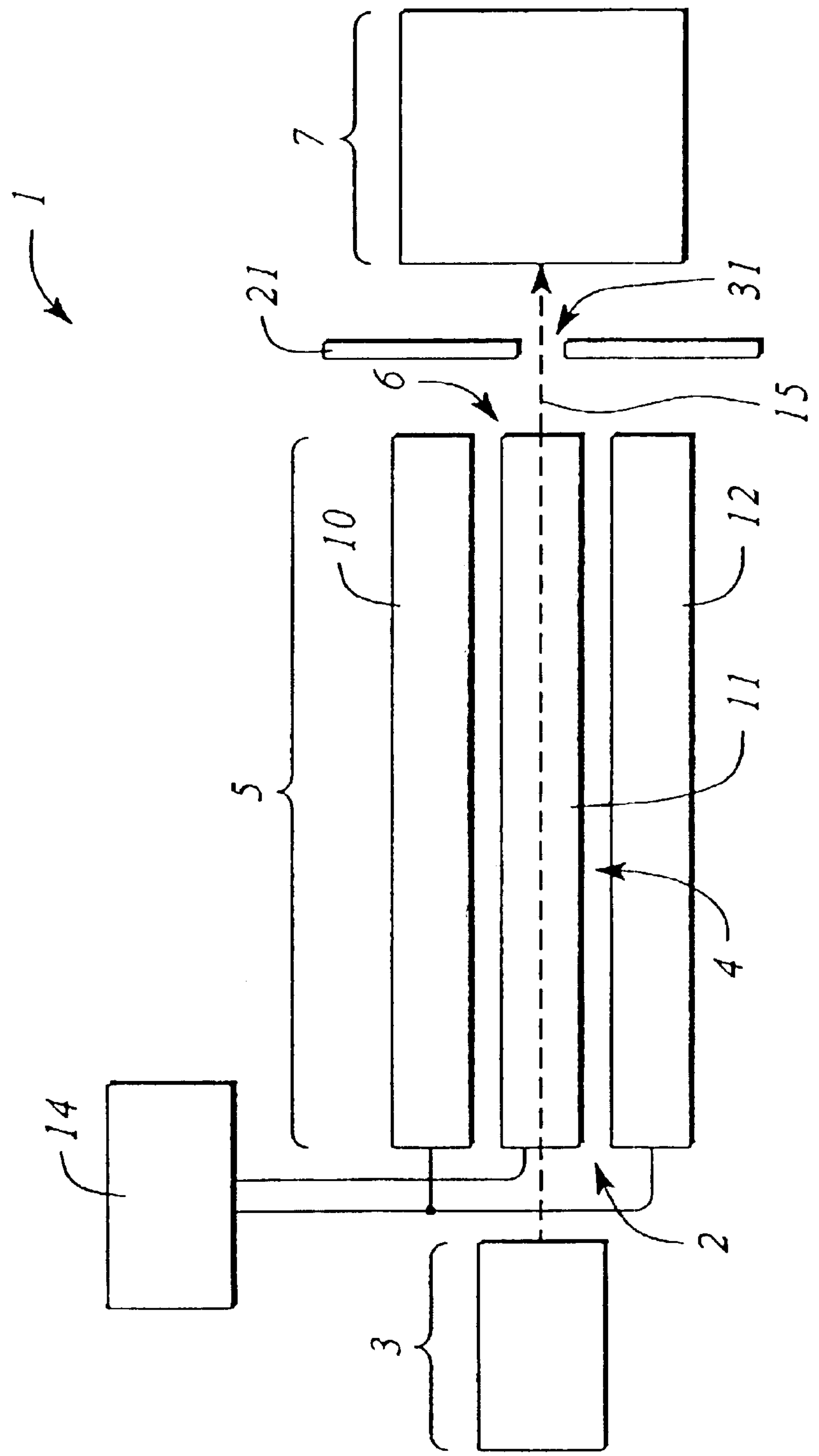
FIG. 2 is a side elevation of a mass spectrometer incorporating the invention.

FIG. 2 shows a side elevation of the present invention. A high frequency quadrupole field is created in a separation region 4 between the rods 11 and 13 and 10 and 12 by applying electrical field voltages from the voltage source 14. The voltage source 14 may deliver an A.C. voltage (V cos ωt) and a D.C. voltage U, both independently adjustable.

The quadrupole mass filter 5 has an entrance end 2, the separation region 4 enclosed by four parallel rods 10, 11, 12, and 13, and an exit end 6. The rod 10 is connected to the rod 12 opposite thereto, forming a pair of interconnected rods, and the rod 11 is connected to the rod 13 opposite thereto, forming a second pair of interconnected rods. The first pair of interconnected rods 10 and 12 is connected to a first terminal of a voltage source 14 and the second pair of interconnected rods 11 and 13 is connected to a second terminal of the voltage source such that the voltage source creates a potential difference between the first pair of rods 10 and 12 on the one hand and the second pair of rods 11 and 13 on the other hand. The mask plate 21 is disposed between the exit end 6 and the ion detector 7 with the lobed aperture 31 centered on the longitudinal axis 15. The mask plate 21 may be fabricated from stainless steel or other conducting or non-conducting metals or alloys capable of blocking neutral atoms from passing to the ion detector 7. The lobed aperture 31 is designed for receiving, filtering and transmitting an ion beam 17 passing along the longitudinal axis 15. The lobed aperture 31 is congruent with the ion beam transmission profile, which in turn is similar to the shapes of the electric field lines between the rods, i.e. in the interior of the filter (See FIG. 5). The mask plate 21 may be an integral part of mass spectrometer 1, an integral part of the quadrupole mass filter 5, part of the detector, or a separate installable part. As an installable part, the mask plate 21 may be mounted on any of these parts or components. The mask plate 21 may be mounted on these parts or components so that the lobed aperture 31 can be freely rotated and select a variety of fixed rotatable positions about the longitudinal axis 15 (See FIG. 1).

The lobed aperture 31 may comprise one or more lobes. FIG. 3B shows an embodiment in which the lobed aperture 31 comprises two lobes 33 and 35. The first lobe 33 and the second lobe 35 are symmetric and extend radially from the longitudinal axis 15.

Figure 4A:
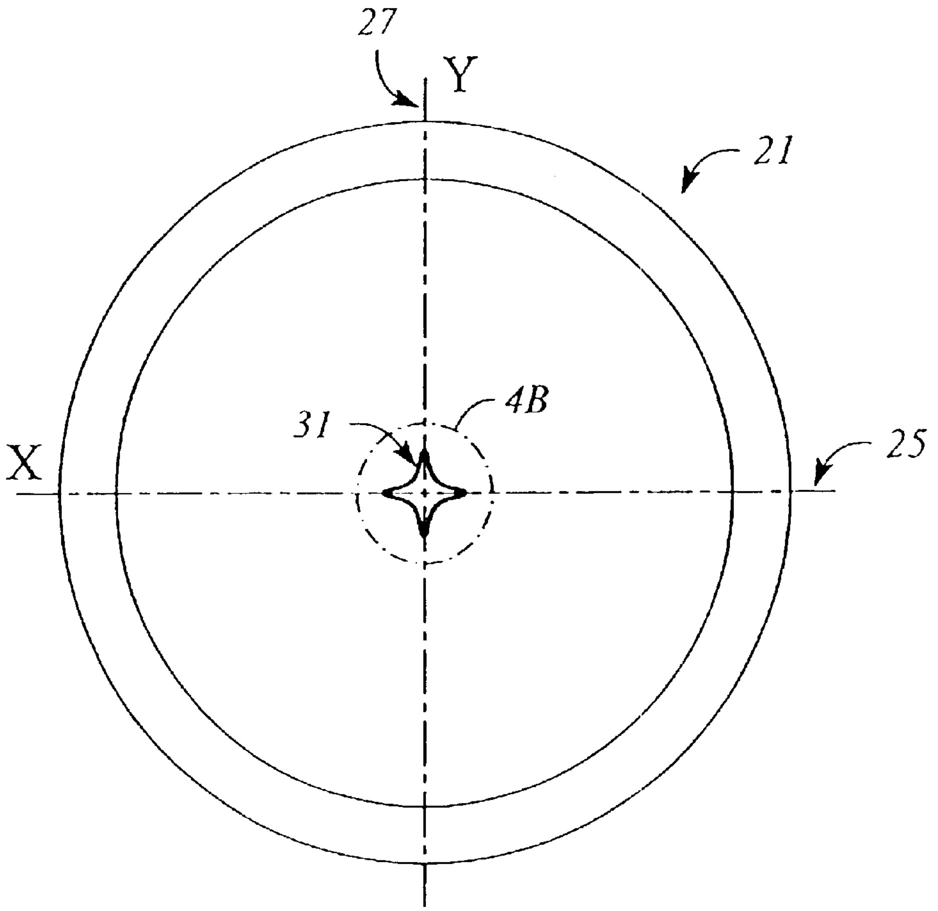
FIG. 4A is a plan view of a mask plate showing a second embodiment of the invention.
Figure 4B:
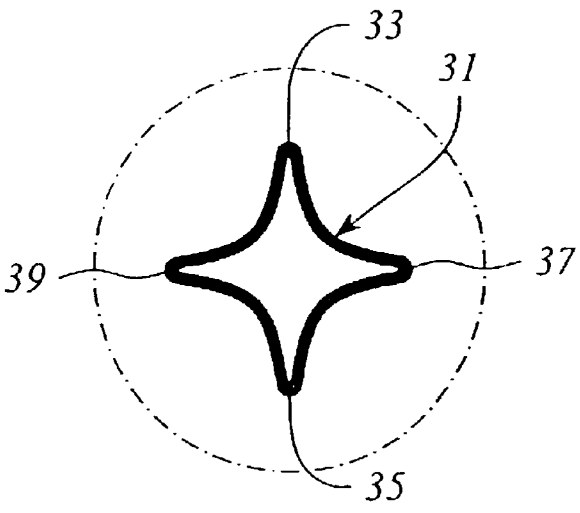
FIG. 4B is an enlarged portion of FIG. 4A showing a second embodiment of the invention.

As shown in FIG. 4B, the lobed aperture 31 may also comprise a third lobe 37 and a fourth lobe 39, which are also symmetric and extend radially from the longitudinal axis 15. The third lobe 37 and the fourth lobe 39 may be orthogonal to the first lobe 33 and the second lobe 35.

The lobed aperture 31 is shaped and dimensioned to transmit approximately 50–90% of the ion beam 17 and more preferably to transmit 90% while removing a substantial number of the interfering neutral atoms.

The lobed aperture 31 is aligned with the exit end 6 of the quadrupole mass filter 5 and a quadrupole field 8 in such a way that when the ion beam 17 exits the quadrupole mass filter 5 at the exit end 6, it passes through the lobed aperture, and interfering neutral atoms are filtered by the mask plate 21. The neutral atoms outside the beam, but still within a quadrupole boundary 19, are removed by the mask plate 21 and the resulting filtered beam then enters the ion detector 7. The intensity of the ion beam is not affected, because the neutral atoms are substantially removed at the periphery of the beam.

Figure 3A:
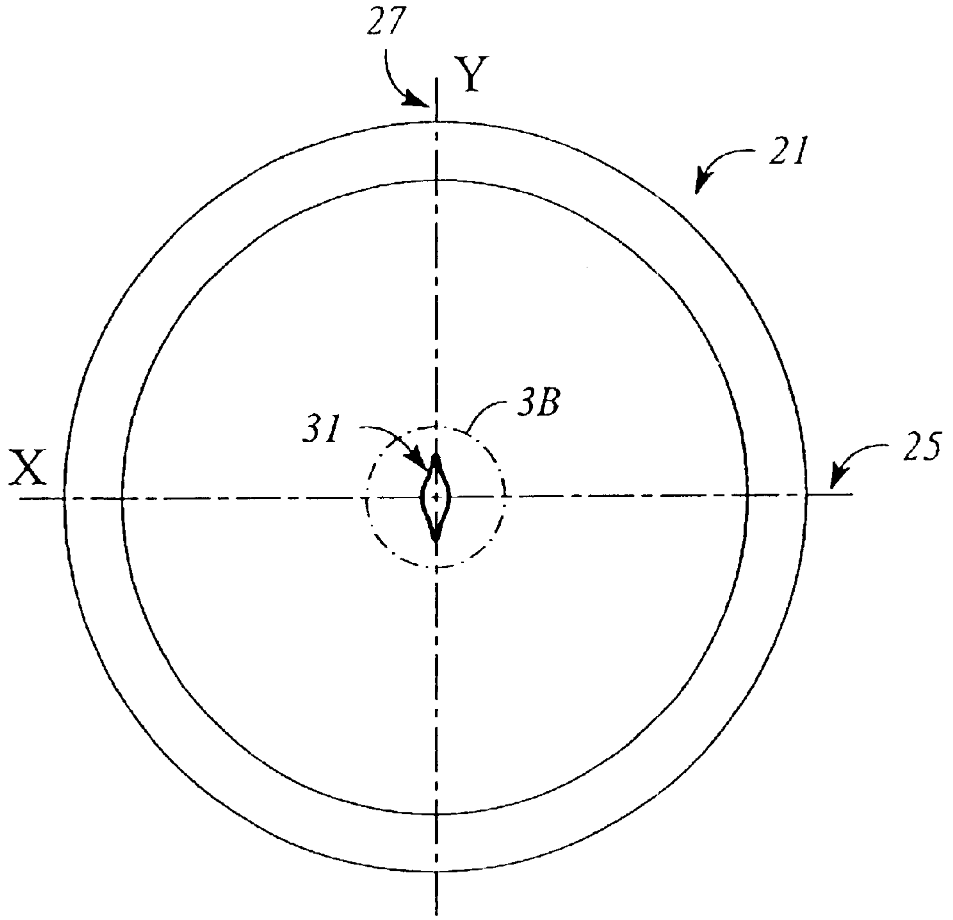
FIG. 3A is a plan view of the mask plate showing a first embodiment of the invention.
Figure 3B:
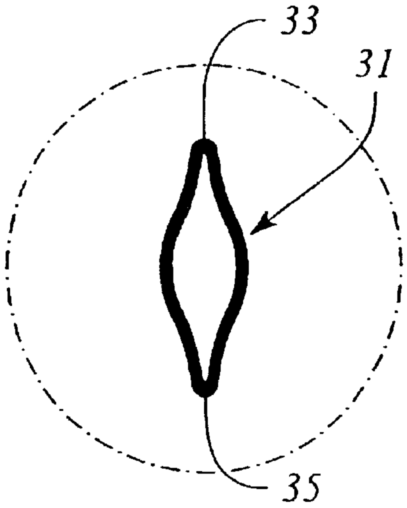
FIG. 3B is an enlarged portion of FIG. 3A showing a first embodiment of the invention.

FIGS. 3A and 3B show the mask plate 21 with the orientation and design of a first embodiment of the invention. The mask plate 21 defines an embodiment of the lobed aperture that comprises a first lobe 33 and a second lobe 35 (See FIG. 3B). The lobes 33 and 35 are symmetric and extend radially from the longitudinal axis 15. Both lobes are aligned along a y-axis 27 perpendicular to cylindrical rods 11 and 13. The y-axis extends between the axes of rods 11 and 13. The usual way or convention for labeling these axes is: x: (U-V cos ωt) and y:-(U-V cos ωt).

FIGS. 4A and 4B show a second embodiment of the invention. This embodiment is similar to the embodiment shown in FIGS. 3A and 3B. However, the mask plate 21, also comprises a third lobe 37 and a fourth lobe 39 (See FIG. 4B). The third lobe 37 and the fourth lobe 39 are symmetric and extend radially from the longitudinal axis 15. Both lobes are aligned on the x-axis 25, orthogonal to the first lobe 33 and the second lobe 35. The x-axis extends between the axes of rods 11 and 13. The usual way or convention for labeling these axes is: x: (U-V cos ωt) and y:-(U-V cos ωt).

Figure 5:
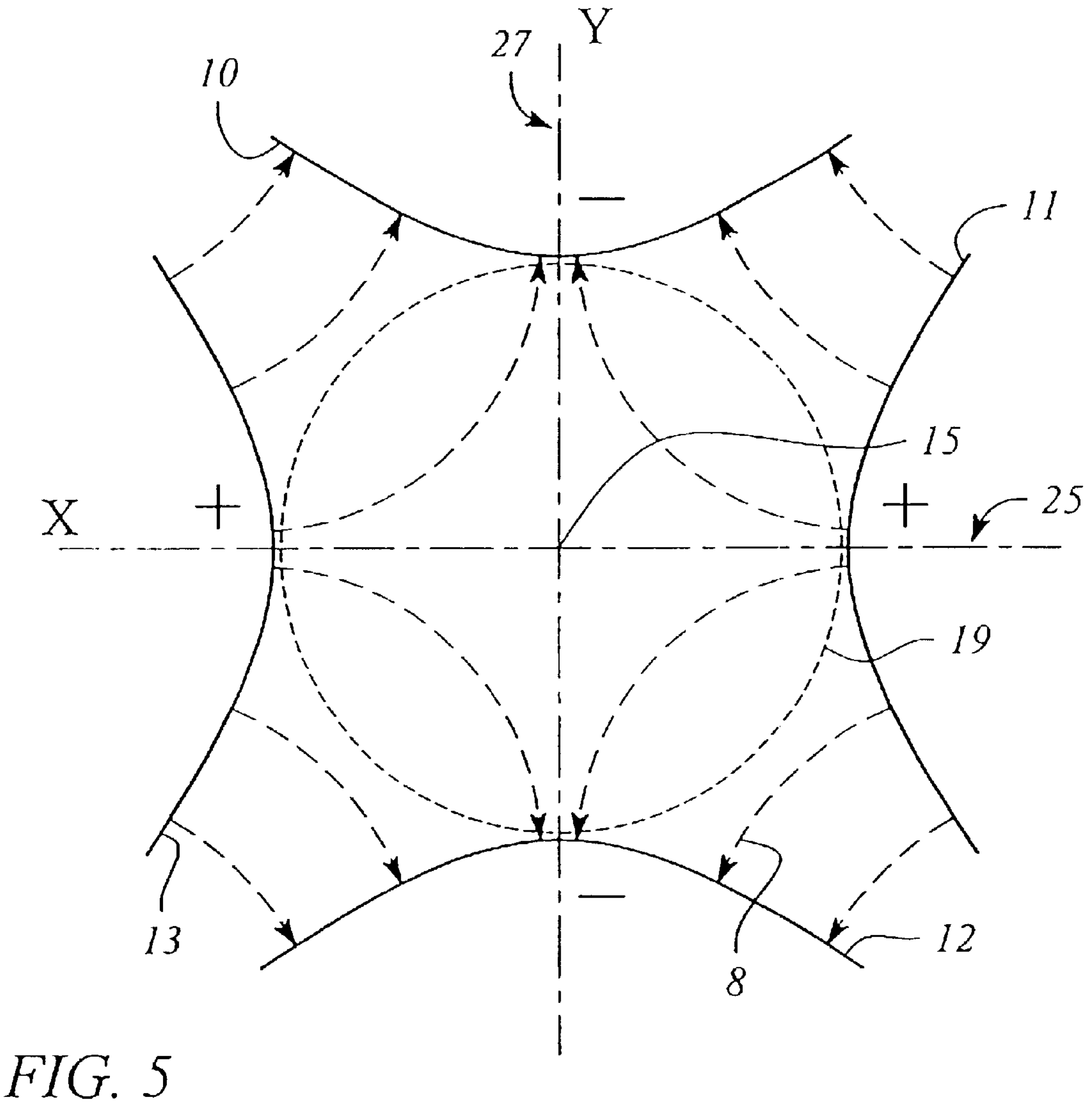
FIG. 5 is a view looking along the longitudinal axis from the ion source toward the ion detector showing the position and orientation of the quadrupolar field.

FIG. 5 shows a view of the quadrupole field 8 viewed from the ion source 3 and looking along the longitudinal axis 15 toward the ion detector 7, both shown in FIG. 1. Rods 10 and 12 and 11 and 13 are aligned parallel to the longitudinal axis 15. The diagram shows the lines of the quadrupole field 8 and how they define a star shaped pattern near the x and y-axes.

Figure 6A:
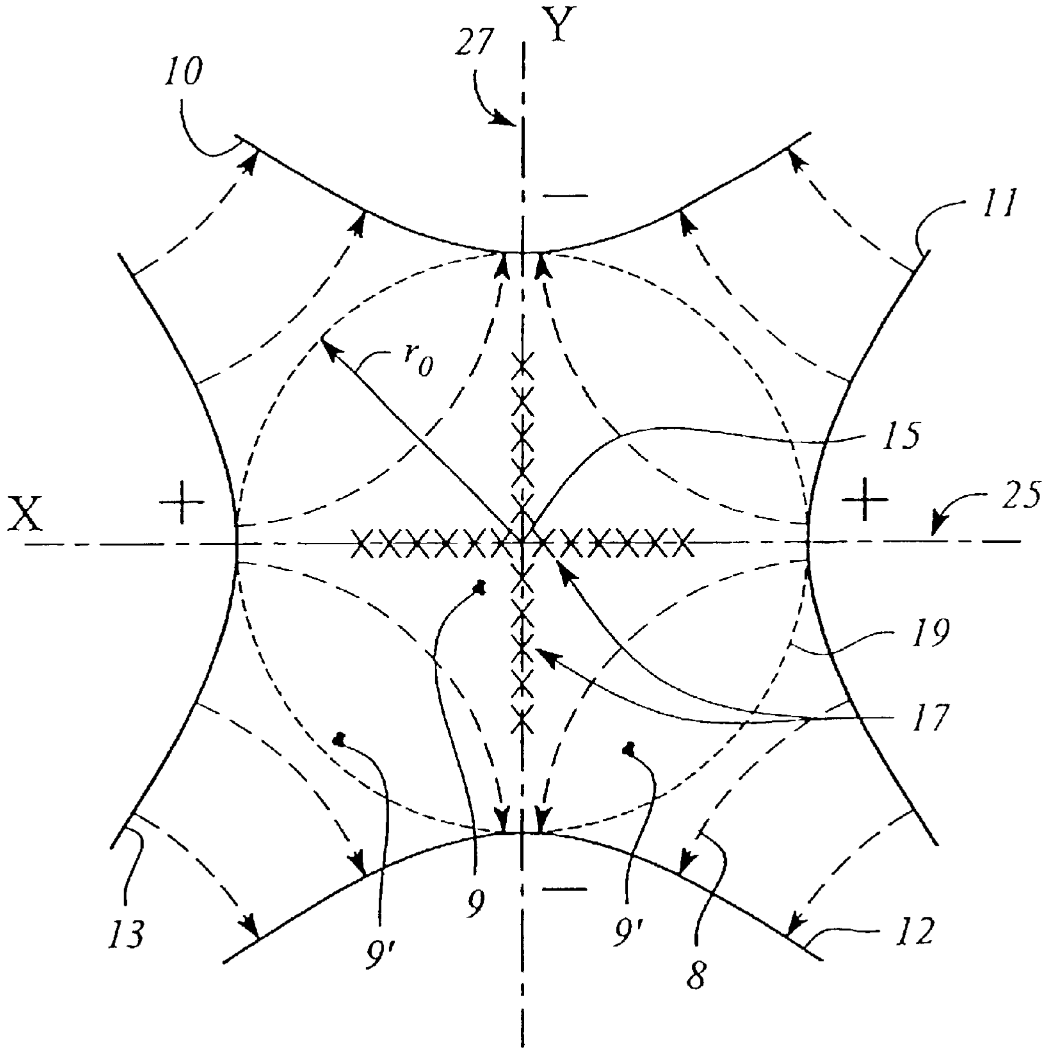
FIG. 6A is a view looking along the longitudinal axis from the ion source toward the ion detector showing the neutral atoms and ion beam number density and location(s).

FIG. 6A shows a view of a conventional quadrupole mass spectrometer looking along the longitudinal axis 15 from the ion source 3 toward the ion detector 7 showing a cross section view of the ion beam 17 before reaching the mask plate 21. The quadrupole rods are drawn in a hyperbolic shape used in most quadrupole mass filters. Only ions within the quadrupole boundary 19 and located on or near the x-axis 25 and the y-axis 27 will pass through the lobed aperture 31 to the ion detector 7. The ions in the ion beam 17 oscillate between rods 10 and 12 and 11 and 13 and maintain a highest number density along the x-axis 25 and the y-axis 27. For clarity, rods 11, 13, 10 and 12 are increased in size in the diagram. The neutral atoms 9 are distributed randomly across the quadrupole field 8. If no mask plate 21 were applied, the exemplary neutral atoms 9', located within the quadrupole boundary 19 reach the ion detector 7. Quadrupole boundary 19 is defined by the end of the quadrupole field 8 or a grounded casing. Exemplary neutral atoms 9', cause neutral noise problems and lower sensitivity. The ion beam 17 has a greatest number density at the longitudinal axis 15 and has a number density profile having a lobed cross section pattern.

Figure 6B:
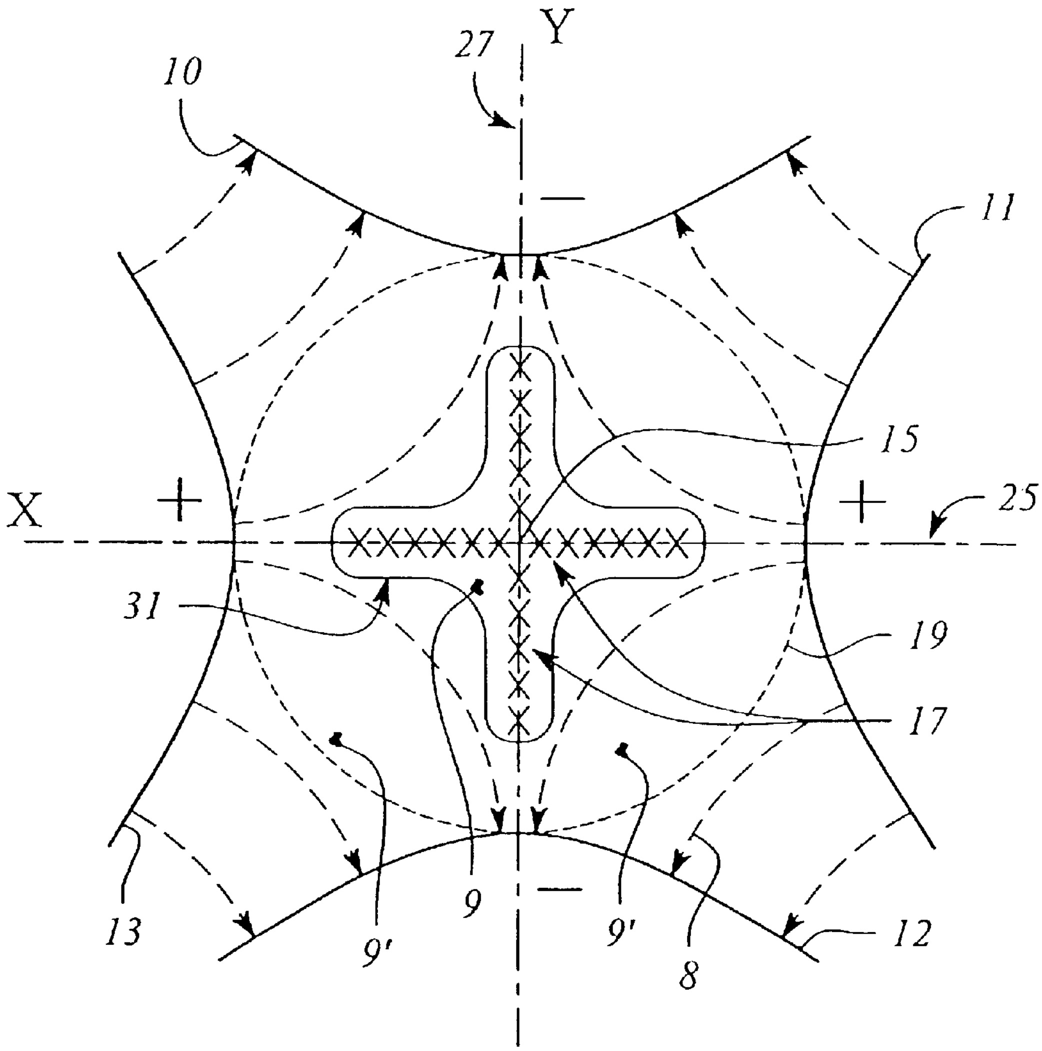
FIG. 6B is a similar view to 6A, but contains the addition of the mask plate.

FIG. 6B shows a similar view to 6A, but the mask plate 21 has been added to the diagram. The quadrupole rods shown in 6B are drawn in a hyperbolic shape used in most quadrupole mass filters. The mask plate 21 has the lobed aperture 31 similar in shape to the cross section shape of the ion beam 17. This allows only the ion beam 17 to pass through the lobed aperture 31 and prevents neutral atoms 9' from reaching the ion detector 7. It should be noted that although the mask plate 21 removes a substantial fraction of neutral atoms, it does not completely remove all neutral atoms. It removes a portion of the neutral atoms without substantially affecting the ion beam 17. Removing the 9' neutral atoms from the ion beam 17 provides for a significantly improved signal to noise ratio with little effect on the ion beam 17. This degree of improved performance has never been achieved before using conventional round apertures or stop plates.

Having now described the mask plate with a lobed aperture, the method of removing neutral noise from the transmitted ion beam will now be described. The technique may utilize an instrument, apparatus, mask plate or component that may be placed in the path of the ion beam. Generally this is accomplished by placing such structures between the quadrupole exit end 6 and the ion detector 7. The cross-sectional shape of the ion beam 17 is substantially lobed and allows for a method of removing the neutral atoms 9'. The method of removing the neutral atoms 9' is accomplished by first transmitting the ion beam 17 having a lobed cross-sectional shape toward the ion detector 7. The mask plate 21 having a lobed aperture 31 is then provided to intersect and filter the ion beam 17 before it reaches the ion detector 7. The method removes the exemplary neutral atoms 9' without substantially effecting the ion beam intensity. A higher signal to noise or sensitivity is produced in the instrument.

The mask plate 21 can be rotatably mounted to allow a user to position the lobed aperture 31 in any of several positions about the longitudinal axis 15. This option is particularly useful when the lobed aperture 31 comprises a single lobe. In such a case, the first lobe 33 can be used to allow interchange of D.C. polarities on the rods.

Other embodiments of the invention may also exist in which the neutral noise source or the distribution of neutral noise is shaped differently to the star shaped pattern emerging from the exit end of a quadrupole. An important aspect of the invention is that the aperture closely model the cross sectional shape of the ion beam that is transmitted. This would also include, for instance, cases where the ion beam can be shaped (i.e. most optic systems and D.C. quadrupole lenses).

Clearly, minor changes may be made in the form and construction of the invention without departing from the scope of the invention defined by the appended claims. It is not, however, desired to confine the invention to the exact form herein shown and described, but it is desired to include all such as properly come within the scope claimed.

We claim:

1. A method of removing neutral noise from an ion beam, comprising:

(a) transmitting an ion beam having a lobed cross-sectional shape; and (b) filtering said ion beam with a mask plate that has a lobed aperture.

2. A method of removing neutral noise from an ion beam, as recited in claim 1, wherein said lobed aperture has a shape substantially similar to the cross-sectional area of the ion beam.

3. A mask plate having an aperture shaped for removing neutral noise from an ion beam that is directed along a longitudinal axis through said aperture, said aperture comprising:

(a) a central portion at said axis; and (b) at least one lobe contiguous with said primary portion and extending radially from said longitudinal axis.

4. The mask plate as recited in claim 3, wherein said lobe is a first lobe and said aperture further comprises a second lobe extending radially from said longitudinal axis in an opposite direction from said first lobe.

5. The mask plate as recited in claim 4, wherein said aperture comprises third and fourth lobes extending radially from said longitudinal axis and symmetrically positioned with respect to said first and second lobes.

* * * * *